US012697573B2

(12) United States Patent
Yamamoto et al.

(10) Patent No.: US 12,697,573 B2
(45) Date of Patent: Aug. 4, 2026

(54) MIST COLLECTOR AND MACHINE TOOL

(71) Applicant: DMG MORI CO., LTD., Nara (JP)

(72) Inventors: Kosuke Yamamoto, Nara (JP);
Masahiro Kosuge, Nara (JP)

(73) Assignee: DMG MORI CO., LTD., Nara (JP)

( * ) Notice: Subject to any disclaimer, the term of this
patent is extended or adjusted under 35
U.S.C. 154(b) by 266 days.

(21) Appl. No.: 18/560,170

(22) PCT Filed: May 17, 2021

(86) PCT No.: PCT/JP2021/018626
§ 371 (c)(1),
(2) Date: Nov. 10, 2023

(87) PCT Pub. No.: WO2022/244064
PCT Pub. Date: Nov. 24, 2022

(65) Prior Publication Data
US 2024/0246014 A1    Jul. 25, 2024

(51) Int. Cl.
*B01D 45/14* (2006.01)
*B01D 46/00* (2022.01)
*B23Q 11/10* (2006.01)

(52) U.S. Cl.
CPC ......... *B01D 46/0056* (2013.01); *B01D 45/14*
(2013.01); *B01D 46/0049* (2013.01); *B23Q*
*11/1069* (2013.01)

(58) Field of Classification Search
CPC .............................. B01D 45/12; B01D 45/14
See application file for complete search history.

(56) References Cited

FOREIGN PATENT DOCUMENTS

| CN | 203971595 U | 12/2014 |
|---|---|---|
| CN | 106390629 A | 2/2017 |
| CN | 207270899 U | 4/2018 |
| JP | H05277318 A | 10/1993 |
| JP | 4856320 B2 * | 1/2012 |
| JP | 2014-033974 A | 2/2014 |
| JP | 6836683 B1 | 3/2021 |
| JP | 2022-035352 A | 3/2022 |

OTHER PUBLICATIONS

Extended European Search Report for corresponding Application
No. 21940684.0, issued Jun. 10, 2024.

(Continued)

*Primary Examiner* — Robert A Hopkins
(74) *Attorney, Agent, or Firm* — Renner, Otto, Boisselle
& Sklar, LLP

(57) ABSTRACT

Provided is a technology for preventing leakage of mist
through a gap in a mist collector. A mist collector configured
to collect mist generated in processing of a workpiece
includes: a rotary filter configured to catch the mist; a drive
unit configured to drive the rotary filter in such a manner as
to rotate about a rotation axis passing through the center of
the rotary filter; and a housing including a tubular portion.
The housing houses the rotary filter in the tubular portion. A
radial direction of the rotary filter is orthogonal to an inner
surface of the tubular portion. An inflow preventing mecha-
nism configured to prevent the mist from flowing into a gap
between the tubular portion and the rotary filter is provided
in housing.

6 Claims, 10 Drawing Sheets

(56)                  References Cited

OTHER PUBLICATIONS

International Search Report for the corresponding International Application No. PCT/JP2021/018626 mailed Aug. 3, 2021, with Machine Translation.
Written Opinion for the corresponding International Application No. PCT/JP2021/018626 mailed Aug. 3, 2021, with Machine Translation.
Japanese Office Action dated Oct. 3, 2023 for corresponding Japanese Patent Application 2023-522013; substantive content of the Japanese Office Action dated Oct. 3, 2023 is the same as that of the above-listed Written Opinion for the corresponding International Application No. PCT/JP2021/018626 mailed Aug. 3, 2021, machine translated.
Office Action issued in counterpart European National Phase Application No. 21940684.0, mailed Dec. 9, 2026.
Office Action received for Chinese Patent Application No. 202180097535.3, mailed on Mar. 26, 2026, 13 pages (6 Pages of English Translation and 7 pages of Official Copy).

* cited by examiner

MIST COLLECTOR AND MACHINE TOOL

CROSS REFERENCE TO RELATED APPLICATION

This application is a national phase of International Application No. PCT/JP2021/018626 filed on May 17, 2021, which is hereby incorporated herein by reference.

TECHNICAL FIELD

The present disclosure relates to a mist collector and a machine tool.

BACKGROUND ART

When a machine tool processes a workpiece with use of a tool, heat is generated. In order to suppress the generation of heat, the machine tool ejects a coolant toward the workpiece. At this time, the coolant vaporizes and mist is generated in the machine tool. Regarding technologies for collecting the mist, Japanese Patent No. 6836683 (Patent Document 1) discloses a machine tool that includes a mist collector.

CITATION LIST

Patent Document

Patent Document 1: Japanese Patent No. 6836683

SUMMARY OF INVENTION

Technical Problem

Mist collected by the mist collector may pass through a gap in the mist collector and leak to the outside of the machine tool. Therefore, there is demand for a technology for preventing leakage of mist through a gap in the mist collector. Note that the machine tool disclosed in Patent Document 1 does not prevent mist from leaking through a gap in the mist collector.

Solution to Problem

In an example of the present disclosure, a mist collector configured to collect mist generated in processing of a workpiece is provided. The mist collector includes: a rotary filter configured to catch the mist; a drive unit configured to drive the rotary filter in such a manner as to rotate about a rotation axis passing through the center of the rotary filter; and a housing including a tubular portion. The housing houses the rotary filter in the tubular portion. A radial direction of the rotary filter is orthogonal to an inner surface of the tubular portion. An inflow preventing mechanism configured to prevent the mist from flowing into a gap between the tubular portion and the rotary filter is provided in the housing.

In an example of the present disclosure, the inflow preventing mechanism includes an annular section provided on the inner surface of the tubular portion in such a manner as to face the gap. The annular section is downstream of the rotary filter in the direction of a flow of air passing through the rotary filter.

In an example of the present disclosure, an inner radius of the annular section in the radial direction is shorter than an outer radius of the rotary filter in the radial direction.

In an example of the present disclosure, the rotary filter includes an edge section and a filter section fixed to the edge section. The inner radius of the annular section in the radial direction is shorter than an outer radius of the edge section in the radial direction.

In an example of the present disclosure, the inner radius of the annular section in the radial direction is longer than an inner radius of the edge section in the radial direction.

In an example of the present disclosure, the inflow preventing mechanism includes a preventive wall having a cylindrical shape. The preventive wall having the cylindrical shape is disposed in such a manner that a central axis of the preventive wall coincides with a central axis of the tubular portion and the preventive wall is upstream of the rotary filter in the direction of a flow of air passing through the rotary filter.

In an example of the present disclosure, an outer radius of the preventive wall in the radial direction is shorter than an outer radius of the rotary filter in the radial direction.

Another example of the present disclosure includes: a cover body defining a processing area; and a mist collector. The mist collector is coupled to the cover body in such a manner as to collect mist generated in the processing area.

The above-described object, other objects, features, aspects, and advantages of the present invention will be clarified by the following detailed description of the present invention to be understood in connection with the attached drawings.

DESCRIPTION OF EMBODIMENTS

Figure 1:
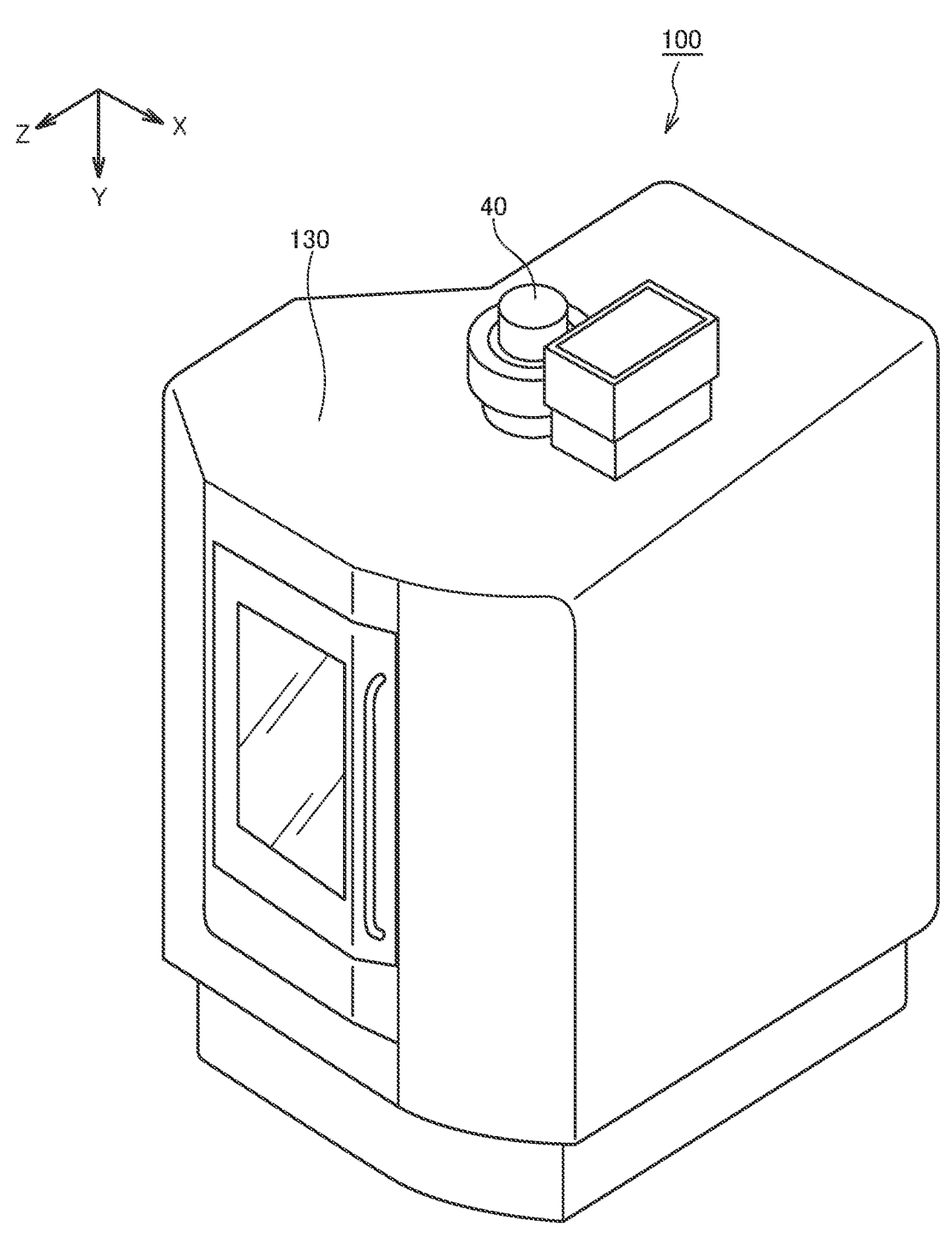
FIG. 1 is a diagram showing an appearance of a machine tool.

The following describes an embodiment according to the present invention with reference to the drawings. In the following description, the same components and the same constitutional elements are denoted by the same reference numeral. Those components and constitutional elements have the same name and the same function. Accordingly, detailed descriptions of those components and constitutional elements are not repeated. The following embodiment and variations can be selectively combined as appropriate.

A. Appearance of Machine Tool 100

The following describes a machine tool 100 according to an embodiment with reference to FIG. 1. FIG. 1 is a diagram showing an appearance of the machine tool 100.

The "machine tool" as used in the present specification is a concept that encompasses various apparatuses having functions for processing a workpiece. In the present specification, a horizontal machining center is described as an example of the machine tool 100, but the machine tool 100 is not limited to this example. For example, the machine tool 100 may also be a vertical machining center. Alternatively, the machine tool 100 may be a lathe, an additive processing machine, or any other cutting machine or griding machine. Furthermore, the machine tool 100 may be a combined machine obtained by combining these machines.

As shown in FIG. 1, the machine tool 100 includes a mist collector 40 and a cover body 130. The cover body 130 is also called a "splash guard", forms the appearance of the machine tool 100, and defines a processing area AR (see FIG. 2) for a workpiece W.

The mist collector 40 is coupled to the cover body 130 in such a manner as to collect mist generated in the processing area AR and prevents the mist from leaking to the outside of the machine tool 100. Note that the position at which the mist collector 40 is installed is not limited to the ceiling of the machine tool 100. For example, the mist collector 40 may be installed on a side surface of the machine tool 100. Alternatively, the mist collector 40 may be provided at a site different from the machine tool 100. In this case, the mist collector 40 is connected to the machine tool 100 by a pipe or the like.

B. Internal Configuration of Machine Tool 100

Figure 2:
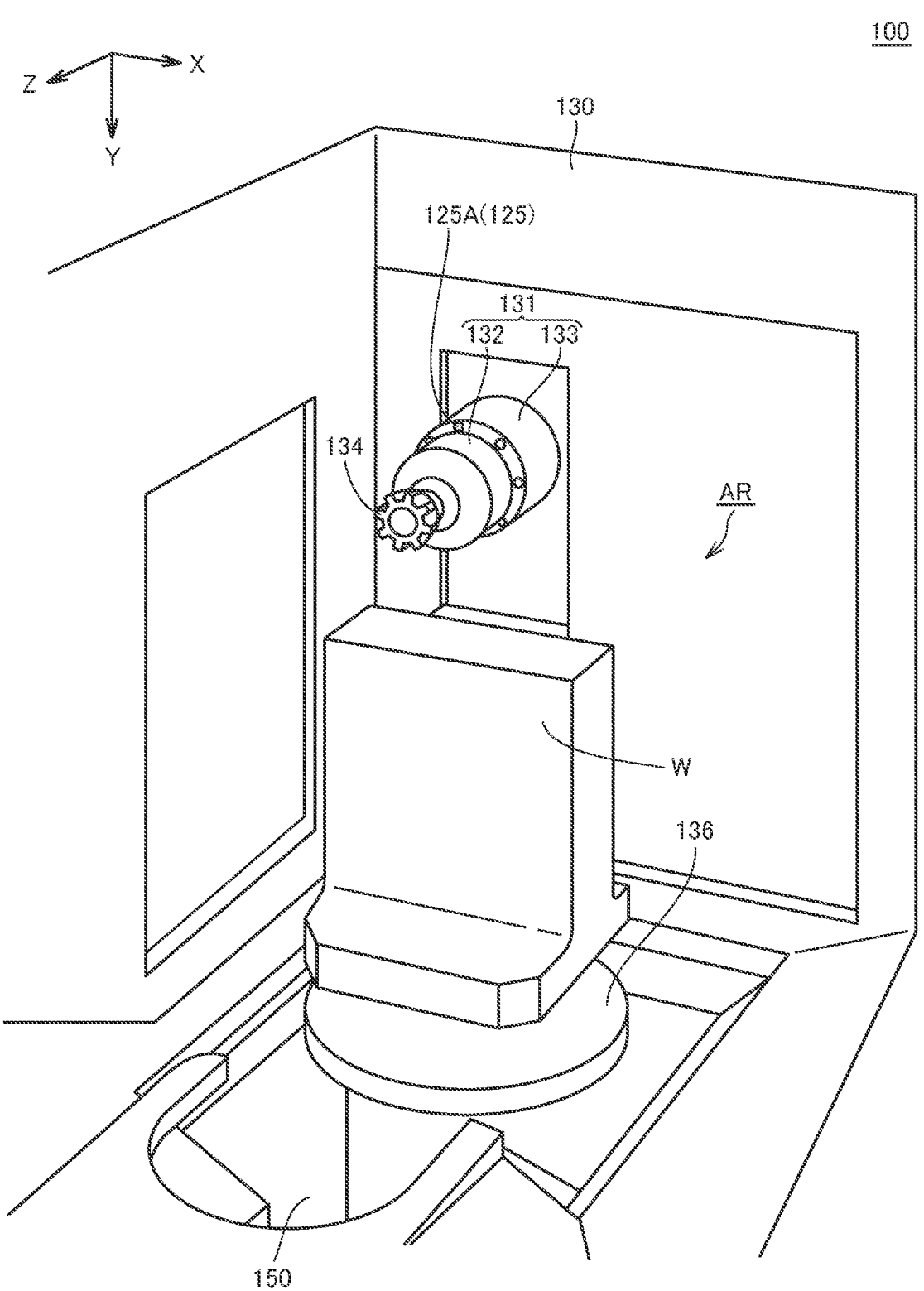
FIG. 2 is a diagram showing the inside of the machine tool.
Figure 3:
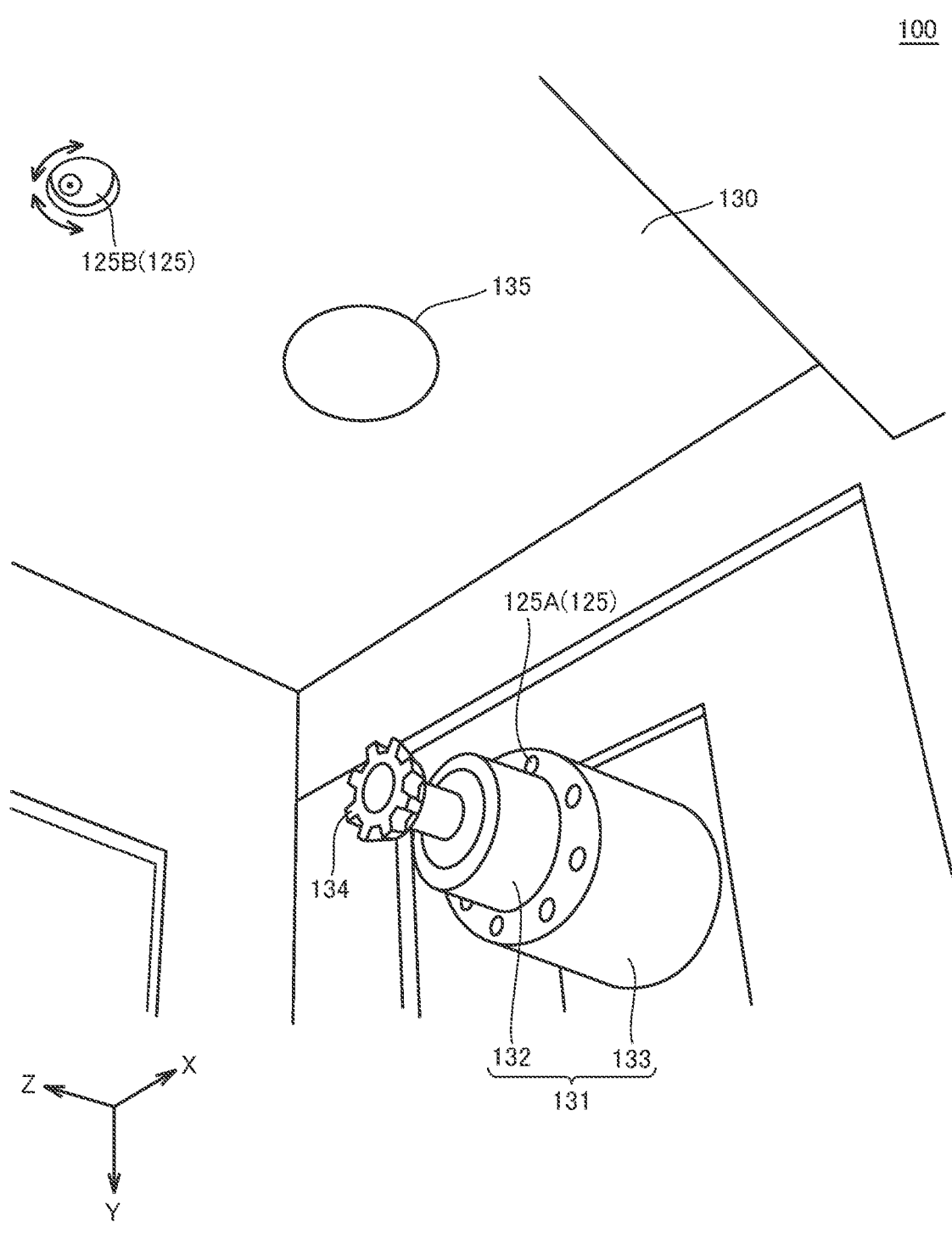
FIG. 3 is a diagram showing the inside of the machine tool as viewed from a direction different from the direction of the view shown in FIG. 2.

Next, the following describes an internal configuration of the machine tool 100 with reference to FIGS. 2 and 3. FIG. 2 is a diagram showing the inside of the machine tool 100. FIG. 3 is a diagram showing the inside of the machine tool 100 as viewed from a direction different from the direction of the view shown in FIG. 2.

As shown in FIGS. 2 and 3, the machine tool 100 includes an ejection part 125 from which a coolant is ejected, a spindle head 131, a tool 134, a table 136, and a chip conveyor 150 therein. The spindle head 131 includes a spindle 132 and a housing 133.

Hereinafter, the axial direction of the spindle 132 will also be referred to as a "Z-axis direction", for the sake of convenience of description. The gravitational direction will also be referred to as a "Y-axis direction". A direction orthogonal to both the Y-axis direction and the Z-axis direction will be referred to as an "X-axis direction".

The ceiling of the cover body 130 includes an opening 135. The above-described mist collector 40 is disposed so as to cover the opening 135. With this configuration, the mist collector 40 collects mist from the processing area AR via the opening 135.

The ejection part 125 is provided inside the machine tool 100 and ejects a coolant to discharge chips generated through processing of the workpiece W to the chip conveyor 150. The ejection part 125 is constituted by one or more ejection mechanisms. FIGS. 2 and 3 show ejection mechanisms 125A and 125B as an example of the ejection part 125.

The ejection mechanism 125A is provided in the spindle head 131. The ejection mechanism 125A may be of a side through type that ejects the coolant from an end face of the spindle through the housing 133 of the spindle head 131 or a center through type that ejects the coolant from an edge of a blade of the tool held by the spindle head 131 through the spindle center of the spindle head 131. The ejection mechanism 125A mainly ejects the coolant toward a processing point on the workpiece to remove chips attaching to the spindle 132 and the tool 134 and suppress generation of heat at the processing point on the workpiece. The ejection mechanism 125A is configured to be capable of being driven in a rotation direction about the X axis (i.e., in an A-axis direction) and in a rotation direction about the Z axis (i.e., in a C-axis direction). With this configuration, the ejection mechanism 125A changes an ejecting direction of the coolant in the A-axis direction and the C-axis direction.

The ejection mechanism 125B is provided above the ejection mechanism 125A. The ejection mechanism 125B is attached to the ceiling portion of the cover body 130, for example. The ejection mechanism 125B mainly ejects the coolant from the cover body 130 throughout the processing area AR. As a result, chips generated through processing of the workpiece W are discharged from the processing area AR to the chip conveyor 150.

The spindle 132 is provided in the housing 133. A tool for processing the workpiece W, which is a processing target, is attached to the spindle 132. In the example shown in FIGS. 2 and 3, the tool 134 used for milling of the workpiece W is attached to the spindle 132.

The chip conveyor 150 is a mechanism for discharging chips generated through processing of the workpiece W to the outside of the processing area AR.

C. Drive Mechanism of Machine Tool 100

Figure 4:
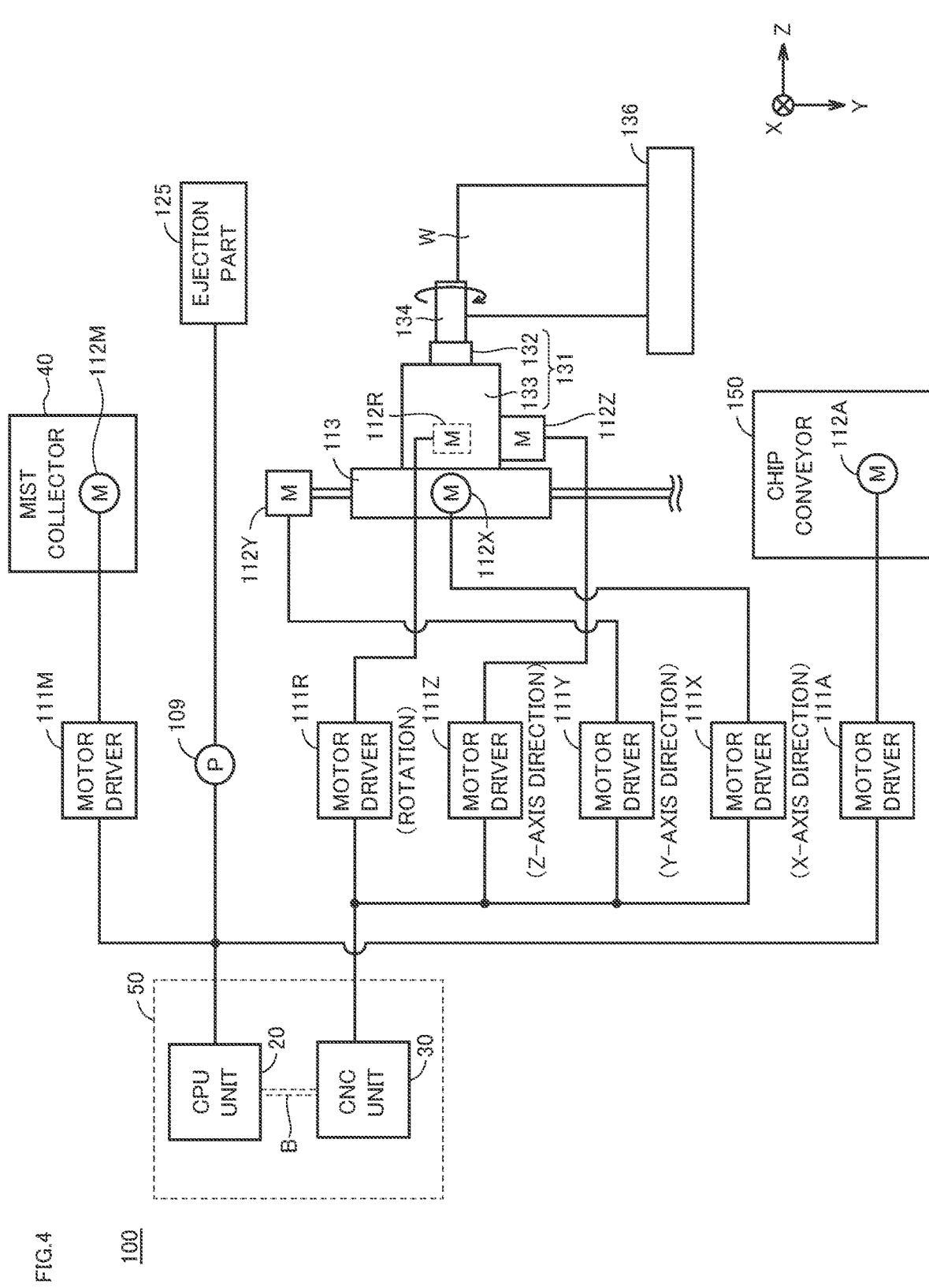
FIG. 4 is a diagram showing a configuration example of drive mechanisms of the machine tool.

Next, the following describes various drive mechanisms of the machine tool 100 with reference to FIG. 4. FIG. 4 is a diagram showing a configuration example of drive mechanisms of the machine tool 100.

As shown in FIG. 4, the machine tool 100 includes a control unit 50, a pump 109, motor drivers 111A, 111R, and 111X to 111Z, motors 112A, 112R, and 112X to 112Z, a movable body 113, the ejection mechanisms 125A and 125B, the spindle head 131, the tool 134, and the table 136.

The term "control unit 50" as used in the present specification means a device that controls the machine tool 100. There is no limitation to the device configuration of the control unit 50. The control unit 50 may be constituted by a single control unit or a plurality of control units. In the example shown in FIG. 4, the control unit 50 is constituted by a CPU unit 20 that is a PLC (Programmable Logic Controller) and a CNC (Computer Numerical Control) unit 30. The CPU unit 20 and the CNC unit 30 communicate with each other via a communication path B (e.g., a field bus or a LAN cable).

The CPU unit 20 controls various units included in the machine tool 100 in accordance with a PLC program designed in advance. The PLC program is written by a ladder program, for example.

In another example, the CPU unit 20 controls a motor driver 111M included in the mist collector 40 in accordance with the PLC program. The motor driver 111M receives input of a target rotational speed of a motor 112M from the CPU unit 20, and controls the motor 112M. Thus, driving of the mist collector 40 is switched ON and OFF, and a mist suction amount of the mist collector 40 is controlled, for example. The motor 112M may be an AC motor, a stepping motor, a servomotor, or any other type of motor.

In another example, the CPU unit 20 controls the pump 109 in accordance with the PLC program to control ejection of the coolant from the ejection part 125. Thus, ejection of the coolant is switched ON and OFF, and a coolant ejection amount is controlled, for example.

In another example, the CPU unit 20 controls the motor driver 111A in accordance with the PLC program. The motor driver 111A receives input of a target rotational speed of the motor 112A from the CPU unit 20, and controls the motor 112A. Thus, driving of the chip conveyor 150 is switched ON and OFF, and a chip conveying speed of the chip conveyor 150 is controlled, for example. The motor 112A may be an AC motor, a stepping motor, a servomotor, or any other type of motor.

The CNC unit 30 starts to execute a processing program designed in advance upon receiving a processing start instruction from the CPU unit 20. The processing program is written by a NC (Numerical Control) program, for example. The CNC unit 30 controls the motor drivers 111R and 111X to 111Z in accordance with the processing program to process the workpiece W fixed on the table 136.

The motor driver 111R successively receives input of a target rotational speed from the CNC unit 30, and controls the motor 112R. The motor 112R rotates the spindle 132 about the Z axis. The motor 112R may be an AC motor, a stepping motor, a servomotor, or any other type of motor.

In the case where the motor 112R is a servomotor, the motor driver 111R calculates an actual rotational speed of the motor 112R based on a feedback signal received from an encoder (not shown) for detecting a rotation angle of the motor 112R. When the calculated actual rotational speed is lower than the target rotational speed, the motor driver 111R increases the rotational speed of the motor 112R, and when the calculated actual rotational speed is higher than the target rotational speed, the motor driver 111R reduces the rotational speed of the motor 112R. As described above, the motor driver 111R makes the rotational speed of the motor 112R closer to the target rotational speed by successively receiving feedback about the rotational speed of the motor 112R.

The motor driver 111X successively receives input of a target position from the CNC unit 30, and controls the motor 112X. The motor 112X drives the movable body 113, to which the spindle head 131 is attached, via a ball screw (not shown) to move the spindle 132 to a desired position in the X-axis direction. The method for controlling the motor 112X by the motor driver 111X is similar to that described above about the motor driver 111R, and a redundant description thereof is omitted. The motor 112X may be an AC motor, a stepping motor, a servomotor, or any other type of motor.

The motor driver 111Y successively receives input of a target position from the CNC unit 30, and controls the motor 112Y. The motor 112Y drives the movable body 113, to which the spindle head 131 is attached, via a ball screw (not shown) to move the spindle 132 to a desired position in the Y-axis direction. The method for controlling the motor 112Y by the motor driver 111Y is similar to that described above about the motor driver 111R, and a redundant description thereof is omitted. The motor 112Y may be an AC motor, a stepping motor, a servomotor, or any other type of motor.

The motor driver 111Z successively receives input of a target position from the CNC unit 30, and controls the motor 112Z. The motor 112Z drives the movable body 113, to which the spindle head 131 is attached, via a ball screw (not shown) to move the spindle 132 to a desired position in the Z-axis direction. The method for controlling the motor 112Z by the motor driver 111Z is similar to that described above about the motor driver 111R, and a redundant description thereof is omitted. The motor 112Z may be an AC motor, a stepping motor, a servomotor, or any other type of motor.

D. Internal Structure of Mist Collector 40

Figure 5:
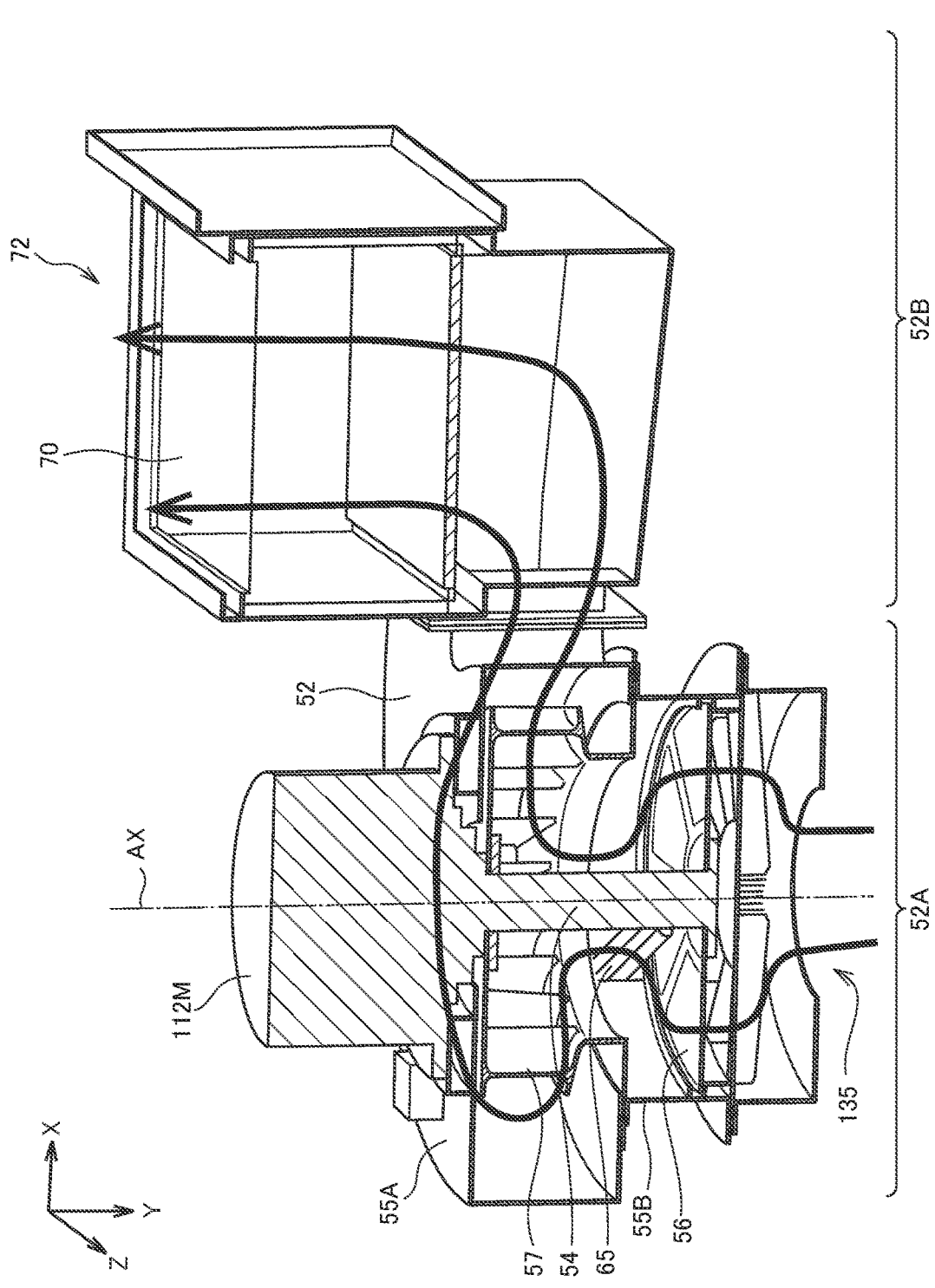
FIG. 5 is a diagram showing a cross section of the mist collector shown in FIG. 1.

Next, the following describes an internal structure of the mist collector 40 with reference to FIG. 5. FIG. 5 is a diagram showing a cross section of the mist collector 40 shown in FIG. 1.

The mist collector 40 includes a housing 52. The housing 52 includes the opening 135 that serves as an air intake port. The mist collector 40 introduces mist from the processing area AR into the housing 52 via the opening 135.

The inside of the housing 52 is divided into a first filtering area 52A and a second filtering area 52B. Mist collected from the processing area AR passes through the first filtering area 52A and the second filtering area 52B in this order.

The first filtering area 52A is constituted by a tubular portion 55A and a tubular portion 55B. The tubular portion 55A is coupled to the tubular portion 55B. The tubular portion 55A and the tubular portion 55B are coaxially arranged with an axis AX as a central axis.

Hereinafter, a direction orthogonal to the axis AX will also be referred to as a "radial direction". Typically, an inner radius of the tubular portion 55A in the radial direction is longer than an inner radius of the tubular portion 55B in the radial direction.

A shaft 54 is housed in the first filtering area 52A. A rotary filter 56 and a fan 57 are fixed to the shaft 54. The shaft 54 is connected to the above-described motor 112M and configured to be rotatable about the axis AX. With this configuration, the shaft 54 functions as a rotation shaft and rotates the rotary filter 56 and the fan 57 together.

The rotary filter 56 is housed in the tubular portion 55A of the housing 52. The radial direction of the rotary filter 56 is orthogonal to an inner surface of the tubular portion 55A. The term "orthogonal" as used here can encompass not only 90° but also substantially 90°. That is, an angle formed between the radial direction of the rotary filter 56 and the inner surface of the tubular portion 55A may be 90° or substantially 90° (for example, 85° or more and 950 or less).

The fan 57 is housed in the tubular portion 55B of the housing 52. The fan 57 functions as a moving blade for creating a flow of air passing through the rotary filter 56. That is, mist in the processing area AR is directed to the rotary filter 56 as a result of the fan 57 rotating. The rotary filter 56 blows off the mist colliding with the rotary filter 56 in the radial direction with centrifugal force. Thus, the mist is caught by the rotary filter 56. The mist caught by the rotary filter 56 is returned into the above-described processing area AR of the machine tool 100 or a coolant tank (not shown).

A multilayer filter 70 is housed in the second filtering area 52B. Unlike the rotary filter 56, the multilayer filter 70 is stationary. The multilayer filter 70 catches mist that has passed through the rotary filter 56. Accordingly, only air is discharged from an exhaust port 72.

E. Mist Inflow Preventing Mechanism

Next, the following describes a mist inflow preventing mechanism with reference to FIGS. 6 to 10.

Figure 6:
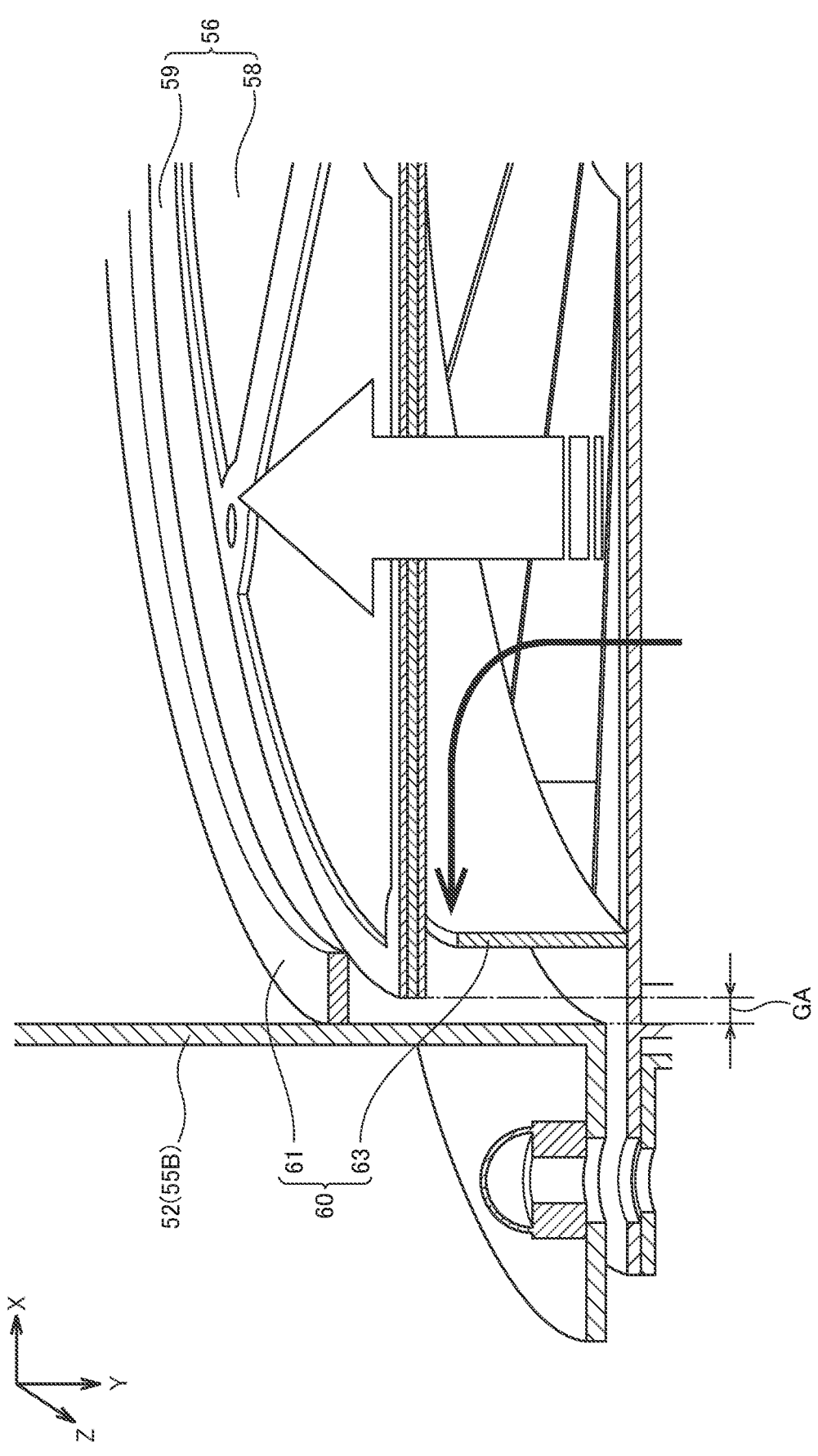
FIG. 6 is an enlarged view of surroundings of a rotary filter shown in FIG. 5.

FIG. 6 is an enlarged view of surroundings of the rotary filter 56 shown in FIG. 5. As shown in FIG. 6, the rotary filter 56 is constituted by a filter section 58 and an edge section 59. The filter section 58 is held by the edge section 59.

As described above, the motor 112M, which is a drive unit, drives the rotary filter 56 and the fan 47 in such a manner as to rotate about a rotation axis passing through the center of the rotary filter 56. As a result, mist is directed to the rotary filter 56. At this time, the mist may pass through a gap GA between the tubular portion 55B and the rotary filter 56. Therefore, an inflow preventing mechanism 60 for preventing mist from flowing into the gap GA is provided in the housing 52. Accordingly, mist is unlikely to pass through the gap GA and more reliably caught by the rotary filter 56.

Various labyrinth mechanisms that can prevent mist from passing through the gap GA can be adopted as the inflow preventing mechanism 60. For example, the inflow preventing mechanism 60 is constituted by at least one of an annular section 61 and a preventive wall 63. The following describes details of the annular section 61 and the preventive wall 63.

E1. Annular Section 61

Figure 7:
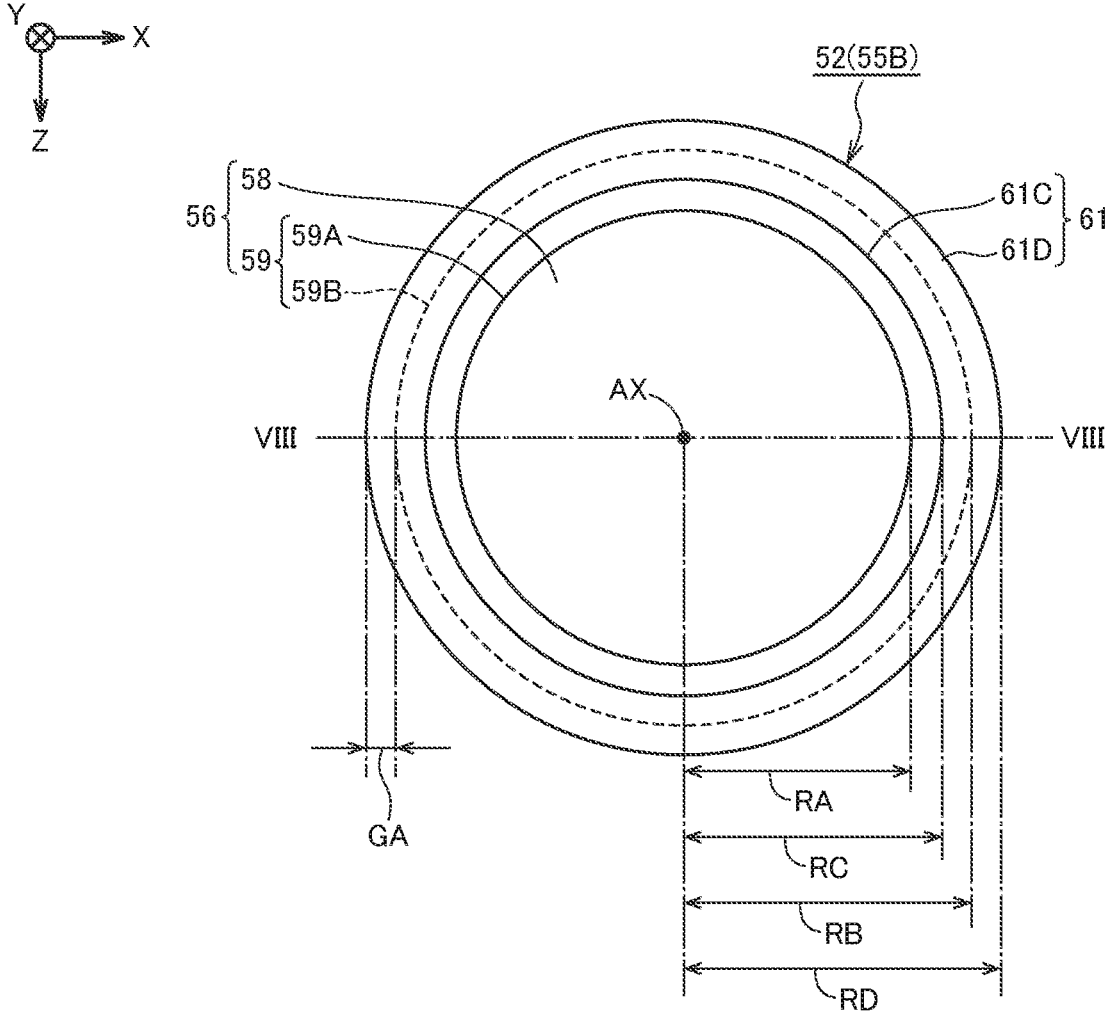
FIG. 7 is a diagram showing the rotary filter and an annular section as viewed from above.
Figure 8:
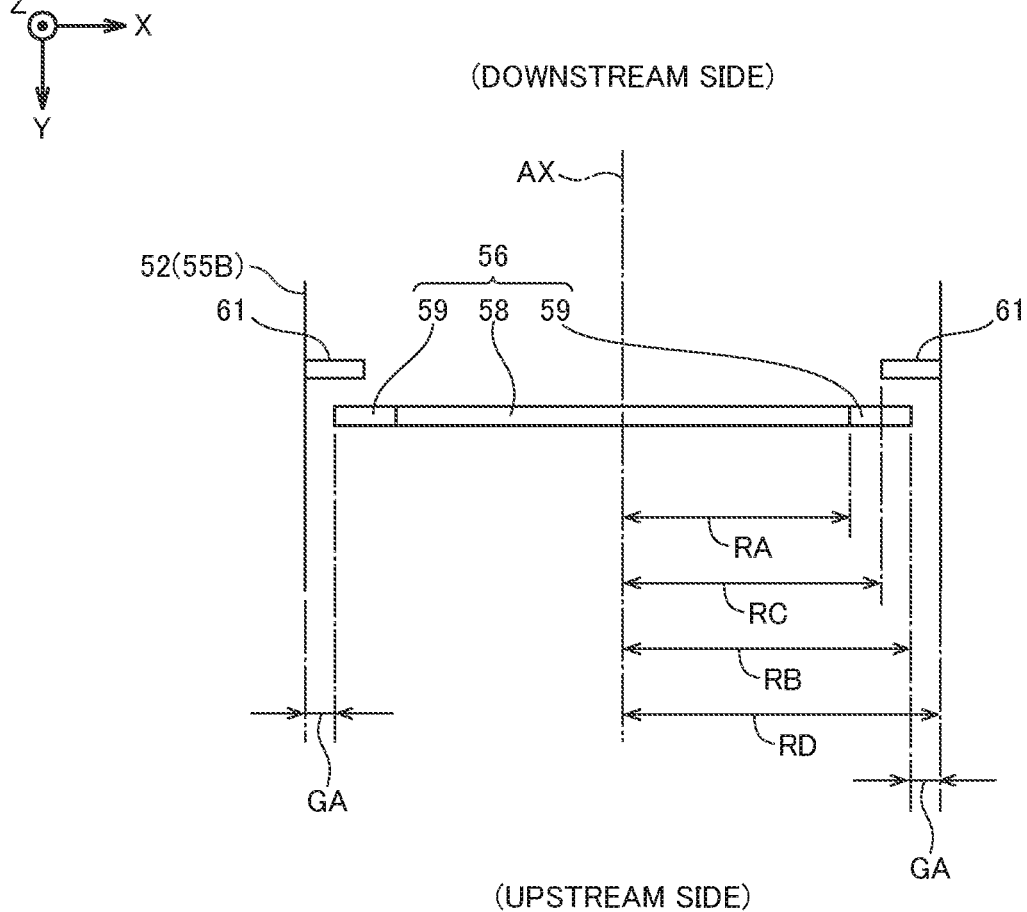
FIG. 8 is a cross-sectional view taken along the line VIII-VIII shown in FIG. 7.

First, the following describes the annular section 61 with reference to FIGS. 7 and 8 and FIG. 6 described above. FIG. 7 is a diagram showing the rotary filter 56 and the annular section 61 as viewed in the Y-axis direction. FIG. 8 is a cross-sectional view taken along the line VIII-VIII shown in FIG. 7.

The annular section 61 has a hollow circular plate shape, for example. The annular section 61 is provided on the inner surface of the tubular portion 55B in such a manner as to face the gap GA. The annular section 61 is downstream of the rotary filter 56 in the direction of a flow of air passing through the rotary filter 56. Accordingly, the annular section 61 serves as a barrier, and mist is unlikely to pass through the gap GA.

More specifically, an inner radius of the annular section 61 in the radial direction is shorter than an outer radius of the rotary filter 56 in the radial direction. Accordingly, the gap GA is completely covered by the annular section 61 as viewed in the Y-axis direction, and mist is unlikely to pass through the gap GA.

Also, the annular section 61 is disposed in such a manner that the central axis of the annular section 61 coincides with the central axis of the rotary filter 56. In other words, the rotary filter 56 and the annular section 61 are coaxially arranged with the axis AX as the central axis. Typically, the annular section 61 is parallel to the rotary filter 56.

In the following description, an inner radius of the edge section 59 of the rotary filter 56 in the radial direction will be referred to as an "inner radius RA", for the sake of convenience of description. Also, an outer radius of the edge section 59 of the rotary filter 56 in the radial direction will be referred to as an "outer radius RB". The inner radius of the annular section 61 in the radial direction will be referred to as an "inner radius RC". An outer radius of the annular section 61 in the radial direction will be referred to as an "outer radius RD". Note that the outer radius RD of the annular section 61 is equal to the inner radius of the tubular portion 55B.

The inner radius RA of the edge section 59 of the rotary filter 56, the outer radius RB of the edge section 59 of the rotary filter 56, the inner radius RC of the annular section 61, and the outer radius RD of the annular section 61 have a relationship expressed by the following formula (1).

$$\text{Inner radius RA} < \text{Inner radius RC} < \text{Outer radius RB} < \text{Outer radius RD} \quad (1)$$

More specifically, the inner radius RC of the annular section 61 is longer than the inner radius RA of the edge section 59 of the rotary filter 56. Accordingly, the annular section 61 does not overlap with the filter section 58 of the rotary filter 56 as viewed in the Y-axis direction, and therefore, mist is likely to pass through the filter section 58 of the rotary filter 56 rather than the gap GA.

Also, the inner radius RC of the annular section 61 is shorter than the outer radius RB of the edge section 59 of the rotary filter 56. Accordingly, the gap GA is completely covered by the annular section 61 as viewed in the Y-axis direction, and mist is more reliably kept from passing through the gap GA.

It is preferable to arrange the rotary filter 56 and the annular section 61 close to each other while keeping the rotary filter 56 from colliding with the annular section 61 during rotation. Typically, a width between the rotary filter 56 and the annular section 61 in the direction of the axis AX is determined in advance at the time of designing. For example, the width between the rotary filter 56 and the annular section 61 in the direction of the axis AX is the same or substantially the same as the width of the gap GA in the radial direction. Alternatively, the width between the rotary filter 56 and the annular section 61 in the direction of the axis AX is longer than a vibration amplitude of the rotary filter 56 in the direction of the axis AX during rotation, and is shorter than a value obtained by adding a predetermined width (e.g., 1 mm to 1 cm) to the vibration amplitude.

E2. Preventive Wall 63

Figure 9:
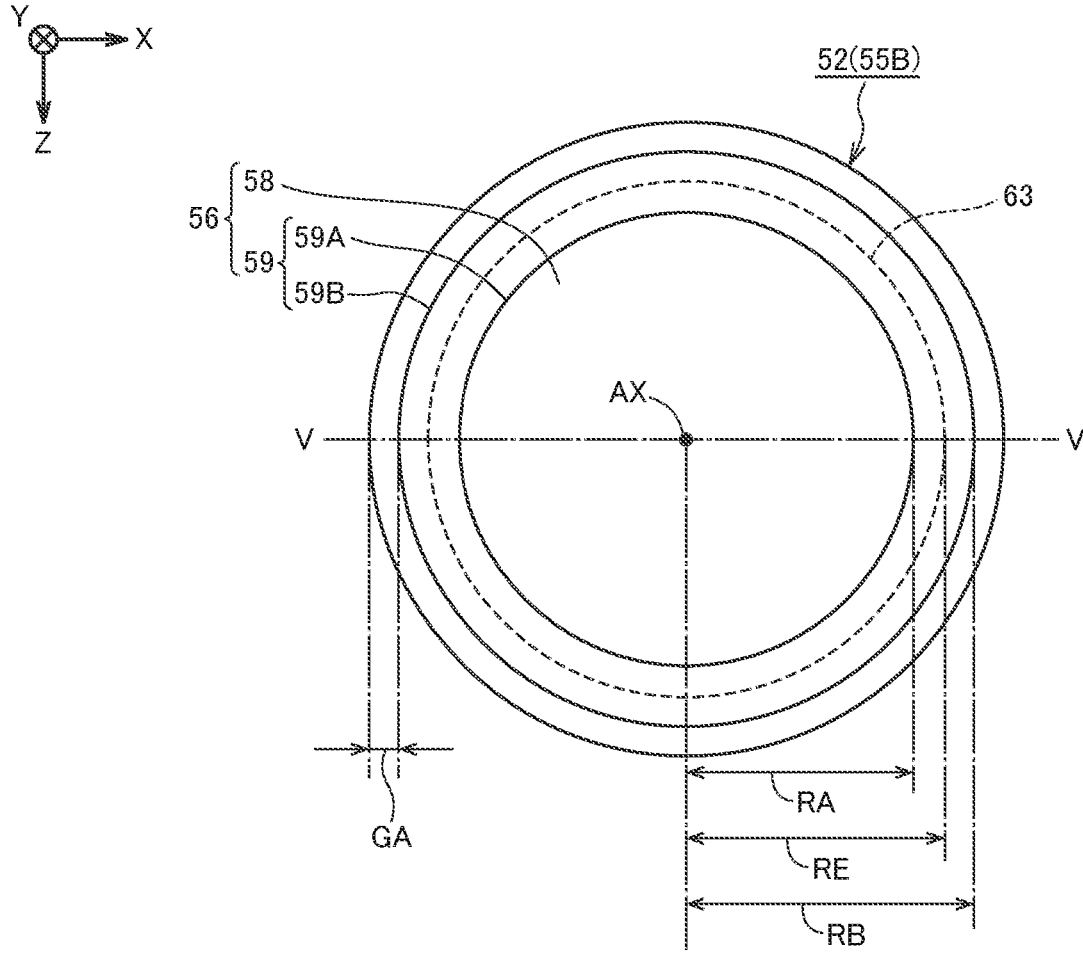
FIG. 9 is a diagram showing the rotary filter and a preventive wall as viewed from above.
Figure 10:
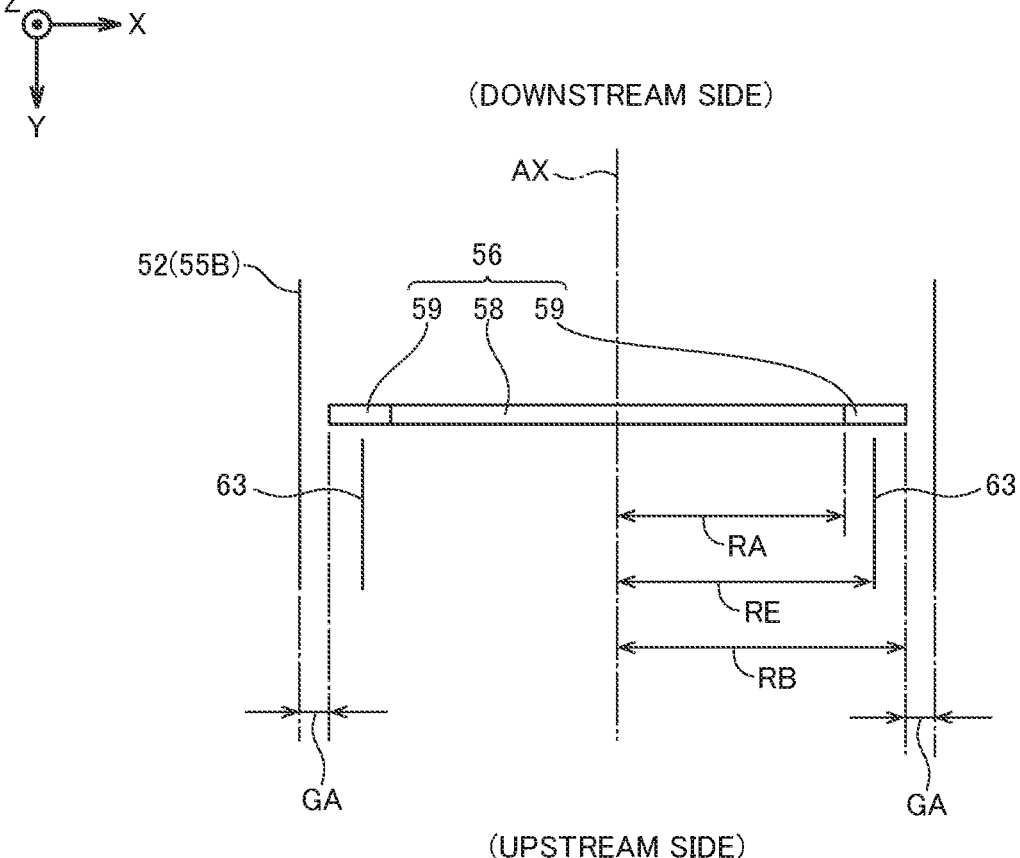
FIG. 10 is a cross-sectional view taken along the line V-V shown in FIG. 9.

Next, the following describes the preventive wall 63, which is an example of the inflow preventing mechanism 60, with reference to FIGS. 9 and 10 and FIG. 6 described above. FIG. 9 is a diagram showing the rotary filter 56 and the preventive wall 63 as viewed in the Y-axis direction. FIG. 10 is a cross-sectional view taken along the line V-V shown in FIG. 9.

The preventive wall 63 has a cylindrical shape, for example. The preventive wall 63 is disposed in such a manner that the central axis of the preventive wall 63 coincides with the central axis of the tubular portion 55B. In other words, the rotary filter 56 and the preventive wall 63 are coaxially arranged with the axis AX as the central axis. Also, the annular section 61 is parallel to the rotary filter 56. The preventive wall 63 is upstream of the rotary filter 56 in the direction of a flow of air passing through the rotary filter 56. Accordingly, mist introduced from the processing area AR is blocked by the preventive wall 63 and is unlikely to pass through the gap GA.

More specifically, an outer radius of the preventive wall 63 in the radial direction is shorter than the outer radius of the rotary filter 56 in the radial direction. Accordingly, the preventive wall 63 is inward of the gap GA as viewed in the Y-axis direction, and mist is more reliably kept from passing through the gap GA. Preferably, an inner radius of the preventive wall 63 in the radial direction is shorter than the outer radius of the rotary filter 56 in the radial direction.

In the following description, the inner radius of the edge section 59 of the rotary filter 56 in the radial direction will be referred to as the "inner radius RA", for the sake of convenience of description. Also, the outer radius of the edge section 59 of the rotary filter 56 in the radial direction will be referred to as the "outer radius RB". Also, the inner radius or the outer radius of the preventive wall 63 in the radial direction will be referred to as a "radius RE".

The inner radius RA of the edge section 59 of the rotary filter 56, the outer radius RB of the edge section 59 of the rotary filter 56, and the radius RE of the preventive wall 63 have a relationship expressed by the following formula (2).

$$\text{Inner radius RA} < \text{Radius RE} < \text{Outer radius RB} \quad (2)$$

More specifically, the radius RE of the preventive wall 63 is longer than the inner radius RA of the edge section 59 of the rotary filter 56. Accordingly, the preventive wall 63 is outward of the filter section 58 of the rotary filter 56 as viewed in the Y-axis direction, and mist is likely to pass through the filter section 58 of the rotary filter 56 rather than the gap GA.

Also, the radius RE of the preventive wall 63 is shorter than the outer radius RB of the edge section 59 of the rotary filter 56. Accordingly, the preventive wall 63 is inward of the gap GA in the radial direction, and mist is more reliably kept from passing through the gap GA.

It is preferable to arrange the rotary filter 56 and the preventive wall 63 close to each other while keeping the rotary filter 56 from colliding with the preventive wall 63 during rotation. Typically, a width between the rotary filter 56 and the preventive wall 63 in the direction of the axis AX is determined in advance at the time of designing. For example, the width between the rotary filter 56 and the preventive wall 63 in the direction of the axis AX is the same or substantially the same as the width of the gap GA in the radial direction. Alternatively, the width between the rotary filter 56 and the preventive wall 63 in the direction of the axis AX is longer than a vibration amplitude of the rotary filter 56 in the direction of the axis AX during rotation, and is shorter than a value obtained by adding a predetermined width (e.g., 1 mm to 1 cm) to the vibration amplitude.

F. Summary

As described above, the mist collector 40 includes the rotary filter 56 in the tubular portion 55B of the housing 52. Also, the mist collector 40 includes the inflow preventing mechanism 60 on the inner surface of the tubular portion 55B to prevent mist from flowing into the gap GA between the tubular portion 55B and the rotary filter 56. Therefore, mist generated inside the machine tool 100 is likely to pass through the rotary filter 56 rather than the gap GA. Consequently, leakage of the mist to the outside of the machine tool 100 is prevented.

The disclosed embodiment is an illustrative example in all aspects and should not be considered as restrictive. The scope of the present invention is defined not by the above descriptions but by the claims, and is intended to encompass all modifications within the meanings and scope that are equivalent to the claims.

LIST OF REFERENCE NUMERALS

20 CPU unit
30 CNC unit
40 Mist collector
47 Fan
50 Control unit
52 Housing
52A First filtering area
52B Second filtering area
54 Shaft
55A Tubular portion
55B Tubular portion
56 Rotary filter
57 Fan
58 Filter section
59 Edge section
60 Inflow preventing mechanism
61 Annular section
63 Preventive wall
65 Drain
70 Multilayer filter
72 Exhaust port
100 Machine tool
109 Pump
111A Motor driver
111M Motor driver 111R Motor driver
111X Motor driver
111Y Motor driver
111Z Motor driver
112A Motor
112M Motor
112R Motor
112X Motor
112Y Motor
112Z Motor
113 Movable body
125 Ejection part
125A Ejection mechanism
125B Ejection mechanism
130 Cover body
131 Spindle head
132 Spindle
133 Housing
134 Tool
135 Opening
136 Table
150 Chip conveyor

The invention claimed is:

1. A mist collector configured to collect mist generated in processing of a workpiece, the mist collector comprising:
a rotary filter configured to catch the mist;
a drive unit configured to drive the rotary filter in such a manner as to rotate about a rotation axis passing through the center of the rotary filter; and
a housing including a tubular portion,
wherein the housing houses the rotary filter in the tubular portion, and a radial direction of the rotary filter is orthogonal to an inner surface of the tubular portion,
an inflow preventing mechanism configured to prevent the mist from flowing into a gap between the tubular portion and the rotary filter is provided in the housing,
the inflow preventing mechanism includes a preventive wall having a cylindrical shape, and
the preventive wall having the cylindrical shape is disposed in such a manner that a central axis of the preventive wall coincides with a central axis of the tubular portion and the preventive wall is upstream of the rotary filter in the direction of a flow of air passing through the rotary filter.

2. The mist collector according to claim 1,
wherein an outer radius of the preventive wall in the radial direction is shorter than an outer radius of the rotary filter in the radial direction.

3. A machine tool comprising:
a cover body defining a processing area; and
the mist collector according to claim 1,
wherein the mist collector is coupled to the cover body in such a manner as to collect mist generated in the processing area.

4. A mist collector configured to collect mist generated in processing of a workpiece, the mist collector comprising:
a rotary filter configured to catch the mist;
a drive unit configured to drive the rotary filter in such a manner as to rotate about a rotation axis passing through the center of the rotary filter; and
a housing including a tubular portion,
wherein the housing houses the rotary filter in the tubular portion, and a radial direction of the rotary filter is orthogonal to an inner surface of the tubular portion,
an inflow preventing mechanism configured to prevent the mist from flowing into a gap between the tubular portion and the rotary filter is provided in the housing, the inflow preventing mechanism includes an annular section provided on the inner surface of the tubular portion in such a manner as to face the gap, and the annular section is downstream of the rotary filter in the direction of a flow of air passing through the rotary filter, and an inner radius of the annular section in the radial direction is shorter than an outer radius of the rotary filter in the radial direction, wherein the rotary filter includes:

an edge section; and a filter section fixed to the edge section, and the inner radius of the annular section in the radial direction is shorter than an outer radius of the edge section in the radial direction.

5. The mist collector according to claim 4, wherein the inner radius of the annular section in the radial direction is longer than an inner radius of the edge section in the radial direction.

6. A machine tool comprising:

a cover body defining a processing area; and the mist collector according to claim 4, wherein the mist collector is coupled to the cover body in such a manner as to collect mist generated in the processing area.

\* \* \* \* \*